United States Patent
Allen et al.

(10) Patent No.: US 10,366,161 B2
(45) Date of Patent: Jul. 30, 2019

(54) ANAPHORA RESOLUTION FOR MEDICAL TEXT WITH MACHINE LEARNING AND RELEVANCE FEEDBACK

(71) Applicant: INTERNATIONAL BUSINESS MACHINES CORPORATION, Armonk, NY (US)

(72) Inventors: Corville O. Allen, Morrisville, NC (US); Roberto DeLima, Apex, NC (US); Aysu Ezen Can, Cary, NC (US); Robert C. Sizemore, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 15/666,694

(22) Filed: Aug. 2, 2017

(65) Prior Publication Data
US 2019/0042559 A1  Feb. 7, 2019

(51) Int. Cl.
| G06F 3/00 | (2006.01) |
| G10L 15/22 | (2006.01) |
| G06F 17/27 | (2006.01) |
| G06N 5/02 | (2006.01) |
| G06N 20/00 | (2019.01) |
| G06F 16/901 | (2019.01) |

(52) U.S. Cl.
CPC ........ *G06F 17/278* (2013.01); *G06F 16/9024* (2019.01); *G06F 17/2705* (2013.01); *G06N 5/02* (2013.01); *G06N 20/00* (2019.01)

(58) Field of Classification Search
CPC combination set(s) only.
See application file for complete search history.

(56) References Cited

U.S. PATENT DOCUMENTS

| 7,475,010 B2 | 1/2009 | Chao |
| 7,813,916 B2 | 10/2010 | Bean |
| 9,542,393 B2 | 1/2017 | Morton et al. |

(Continued)

OTHER PUBLICATIONS

Byron, "Resolving Pronominal Reference to Abstract Entities," Proceedings of the 40th Annual Meeting of the Association for Computational Linguistics (ACL), Philadelphia, Jul. 2002, pp. 80-87.

(Continued)

*Primary Examiner* — Shreyans A Patel
(74) *Attorney, Agent, or Firm* — Jordan T. Schiller (57) ABSTRACT

The program directs a computer processor to resolve an anaphor in electronic natural language text. The program detects a plurality of entities and an anaphor in a span of parsed natural language text comprising one or more sentences, and extracts pairs of related entities based on domain knowledge. The program constructs a set of tuples, wherein each tuple is a data type comprising an anaphor, an antecedent entity (AE) appearing before the anaphor in the span of parsed natural language text, and an entity (E) appearing after the anaphor in the span of parsed natural language text, wherein the anaphor refers to the AE and relates the AE to the E. The program resolves the anaphor by determining which entity in the plurality of entities the anaphor references, using the constructed set of tuples, and selecting an AE among one or more candidate AEs.

20 Claims, 7 Drawing Sheets

(56) References Cited

U.S. PATENT DOCUMENTS

| | | | |
|---|---|---|---|
| 10,019,434 B1* | 7/2018 | Taubman | G06F 17/274 |
| 2005/0216443 A1 | 9/2005 | Morton et al. | |
| 2005/0234709 A1* | 10/2005 | Klavans | G06F 17/2735 |
| | | | 704/10 |
| 2008/0243479 A1* | 10/2008 | Cafarella | G06F 17/30696 |
| | | | 704/9 |
| 2012/0158400 A1 | 6/2012 | Schmidt et al. | |
| 2015/0046150 A1* | 2/2015 | Nakamura | G06Q 10/06316 |
| | | | 704/9 |
| 2016/0042058 A1* | 2/2016 | Nguyen | G06F 17/30684 |
| | | | 707/771 |
| 2016/0098396 A1 | 4/2016 | Morton et al. | |

OTHER PUBLICATIONS

Uzuner et al., "Evaluating the state of the art in coreference resolution for electronic medical records," J Am Med Inform Assoc., 2012; 19: pp. 786-791, doi:10.1136/amiajnl-2011-000784, Published Online First Feb. 24, 2012.

Lappin et al., "An Algorithm for Pronominal Anaphora Resolution," Copyright 1994 (Best date available), Association for Computational Linguistics, vol. 20, No. 4, pp. 535-561.

Mitkov, "Anaphora Resolution: The State of the Art," Publisher: Wolverhampton: School of Languages and European Studies, University of Wolverhampton, 1999 (Best date available), Series: Research report (University of Wolverhampton, Research Group Computational Linguistics and Language Engineering), No. 1, Database: WorldCat, pp. 1-34.

Aone et al., "Evaluating Automated and Manual Acquisition of Anaphora Resolution Strategies," Systems Research and Applications Corporation (SRA), Proceedings of the 33rd Annual Meeting on Association for Computational Linguistics, ACL '95, Cambridge, Massachusettes, Jun. 26-30, 1995, Copyright 1995, Association for Computational Linguistics, Stroudsburg, PA, USA, pp. 122-129.

Disclosed Anonymously, "Leveraging Domain Knowledge to Create Semi-Automated Training Set for Supervised Machine Learning Classification System with Feedback Loop," An IP.com Prior Art Database Technical Disclosure, IP.com No. IPCOM000195709D, IP.com Electronic Publication Date: May 12, 2010, pp. 104.

Disclosed Anonymously, "Confidence Score Assignment for Section-Level Evaluation and Management (E/M) Coding," An IP.com Prior Art Database Technical Disclosure, IP.com No. IPCOM000243506D, IP.com Electronic Publication Date: Sep. 28, 2015, pp. 1-5.

Zheng et al., "Method and System of Online Learning for Recency Search Ranking using Real-Time User Feedback," An IP.com Prior Art Database Technical Disclosure, IP.com No. IPCOM000203007D, IP.com Electronic Publication Date: Jan. 14, 2011, Copyright: Yahoo! 2011 All Rights Reserved, pp. 1-5.

Nøklestad, "A Machine Learning Approach to Anaphora Resolution Including Named Entity Recognition, PP Attachment Disambiguation, and Animacy Detection," May 7, 2009, Doctoral Thesis, Nøklestad, Anders, dc.date.updated : Jul. 8, 2013, pp. 1-295.

Mell et al., "The NIST Definition of Cloud Computing," Recommendations of the National Institute of Standards and Technology, U.S. Department of Commerce, Special Publication 800-145, Sep. 2011, pp. 1-7.

* cited by examiner

ANAPHORA RESOLUTION FOR MEDICAL TEXT WITH MACHINE LEARNING AND RELEVANCE FEEDBACK

BACKGROUND

The present disclosure relates generally to natural language processing, and more particularly to resolving anaphora within natural language text.

Once words or phrases (i.e. entities) are recognized in a span of natural language text, it is useful to delve into semantics, a deeper level than syntax processing, so that the relationships between entities and the overall concepts of the author could be understood by an intelligent system.

BRIEF SUMMARY

Embodiments of the present invention disclose a method, a computer program product, and a system.

According to an embodiment, a method for directing a computer processor to resolve an anaphor in electronic natural language text. The method detects multiple entities and an anaphor in a span of parsed natural language text including one or more sentences. The method extracts pairs of related entities among the multiple entities, based on domain knowledge. The method further constructs a set of tuples, wherein each tuple is a data type including an anaphor, an antecedent entity (AE) appearing before the anaphor in the span of parsed natural language text, and an entity (E) appearing after the anaphor in the span of parsed natural language text, wherein the anaphor refers to the AE and relates the AE to the E, and wherein the constructing is based on initial training data and the extracted pairs of related entities. The method resolves the anaphor by determining which entity in the multiple entities the anaphor references, using the constructed set of tuples, and selecting an AE among one or more candidate AEs.

According to another embodiment, a computer program product for directing a computer processor to resolve an anaphor in electronic natural language text. The storage device embodies program code that is executable by a processor of a computer to perform a method. The method detects a plurality of entities and an anaphor in a span of parsed natural language text including one or more sentences. The method extracts pairs of related entities among the multiple entities, based on domain knowledge. The method further constructs a set of tuples, wherein each tuple is a data type including an anaphor, an antecedent entity (AE) appearing before the anaphor in the span of parsed natural language text, and an entity (E) appearing after the anaphor in the span of parsed natural language text, wherein the anaphor refers to the AE and relates the AE to the E, and wherein the constructing is based on initial training data and the extracted pairs of related entities. The method resolves the anaphor by determining which entity in the multiple entities the anaphor references, using the constructed set of tuples, and selecting an AE among one or more candidate AEs.

According to another embodiment, a system for directing a computer processor to resolve an anaphor in electronic natural language text, includes one or more computer devices each having one or more processors and one or more tangible storage devices. The one or more storage devices embody a program. The program has a set of program instructions for execution by the one or more processors. The program instructions include instructions for detecting a plurality of entities and an anaphor in a span of parsed natural language text including one or more sentences. The program instructions include instructions for extracting pairs of related entities among the multiple entities, based on domain knowledge. The program instructions include instructions for constructing a set of tuples, wherein each tuple is a data type including an anaphor, an antecedent entity (AE) appearing before the anaphor in the span of parsed natural language text, and an entity (E) appearing after the anaphor in the span of parsed natural language text, wherein the anaphor refers to the AE and relates the AE to the E, and wherein the constructing is based on initial training data and the extracted pairs of related entities. The program instructions include instructions for resolving the anaphor by determining which entity in the multiple entities the anaphor references, using the constructed set of tuples, and selecting an AE among one or more candidate AEs.

DETAILED DESCRIPTION

Anaphora resolution is an important part of natural language processing (NLP) in order to derive a clearer understanding from natural language text. An anaphor refers to a segment of natural language text, such as a word or a phrase, that refers to another segment of natural language text. Determining what other segment of natural language text the anaphor refers to may require examining the anaphor's context. The anaphor's context may include one or more segments of text surrounding the anaphor. In one embodiment, the anaphor refers to a segment of text that appears before the anaphor's mention in a span of natural language text under consideration. In another example, the anaphor may be a pronoun or a generalization, and its context may be words in the same sentence or in one or more of its surrounding sentences (e.g. 2 to 3 sentences before and/or 2 to 3 sentences after). A pronoun is a word that substitutes for a noun or a noun phrase, most typically a pronoun. The use of pronouns often involves anaphora, where the meaning of the pronoun is dependent on an antecedent. For example, in the sentence That poor man looks like he needs a new coat, the antecedent of the pronoun he is the noun phrase that poor man. A generalization is the formulation of general concepts from specific instances by abstracting common properties. Generalizations posit the existence of a domain or set of elements, as well as one or more common characteristics shared by those elements. For example, animal is a generalization of bird because every bird is an animal, and there are animals which are not birds.

Anaphora analysis in natural language text often involves analysis of mentions of entities in the natural language text. Analyzing entity-mentions enables semantic analysis, which goes deeper than syntactic analysis. Semantic analysis enables identifying relationships between entities in the span of natural language text and the concepts that the text conveys.

Entities are words or phrases that have an associated classification, according to some knowledge base (which may be as simple as a list or a dictionary). A span of natural language text can be examined to identify the entities it contains. These entities may relate, or refer, to one another in some form. An anaphor can be considered as an entity that refers back to another entity in the span of natural language text. The entity to which the anaphor refers back may be called an antecedent entity (AE). The anaphor may relate the AE to another entity (E) in the span of natural language text, which may appear after the anaphor.

In some spans of natural language text, where there are multiple entities before and/or after the mention of the anaphor, it may be unclear which AE or AEs the anaphor refers to. Consequently, it also may be unclear which Es appearing after an anaphor's mention are related to which AEs appearing before the anaphor's mention. For any E in a span of natural language text under consideration, there may be multiple AEs (i.e. candidate AEs) that are potentially related to the E via the anaphor. The process of determining which AE or AEs are related to the E via the anaphor is called anaphor resolution.

One context in which anaphora resolution may be useful is in medical text analysis. One example of medical text is an electronic medical record (EMR). In medical text analysis, performing accurate anaphora resolution may enable improving the accuracy of treatment recommendations.

Anaphora resolution, according to various embodiments of the invention may be discussed in the context of medical text analysis. Two illustrative example of medical text (i.e. spans of natural language text) that may be found in an EMR include EXAMPLE 1—"Tumors were noted in the brain and liver. They measured 6 cm and 5 cm.", and EXAMPLE 2—"8/20 lymph nodes had evidence of metastatic spread. Tumors were noted in the brain and liver. They measured 6 cm and 5 cm." In each example, the anaphor requiring disambiguation may be they. In each example, there may be one or more Es and AEs that will be used to resolve the anaphor. These will be discussed in more detail in connection with embodiments of the invention.

For instance, in EXAMPLE 1, it is not self-evident that the anaphor they refers to tumors. Without a contextual understanding of the text's semantics, they may equally refer to brain and liver. Therefore, the anaphor they is ambiguous and must be resolved. This fact highlights one reason why embodiments of the present invention disclose a technical solution to a technical problem of processing natural language text electronically. A human being may read the sentences in EXAMPLE 1 and intuitively conclude that they refers to tumors. However, a computer has no intuition and requires a technical solution for the problem of anaphor resolution. Embodiments of the invention provide such a technical solution.

Similarly, in EXAMPLE 2, it is not evident whether they refers to lymph nodes or tumors. Correctly resolving the anaphor requires application of a non-trivial technical solution.

The current state of the art in anaphora resolution either addresses this problem by employing full manual annotations or using only machine learning, which are both time consuming ventures in obtaining training data. The present invention discloses a framework that combines the strengths of both machine learning and manual annotations to resolve anaphora.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
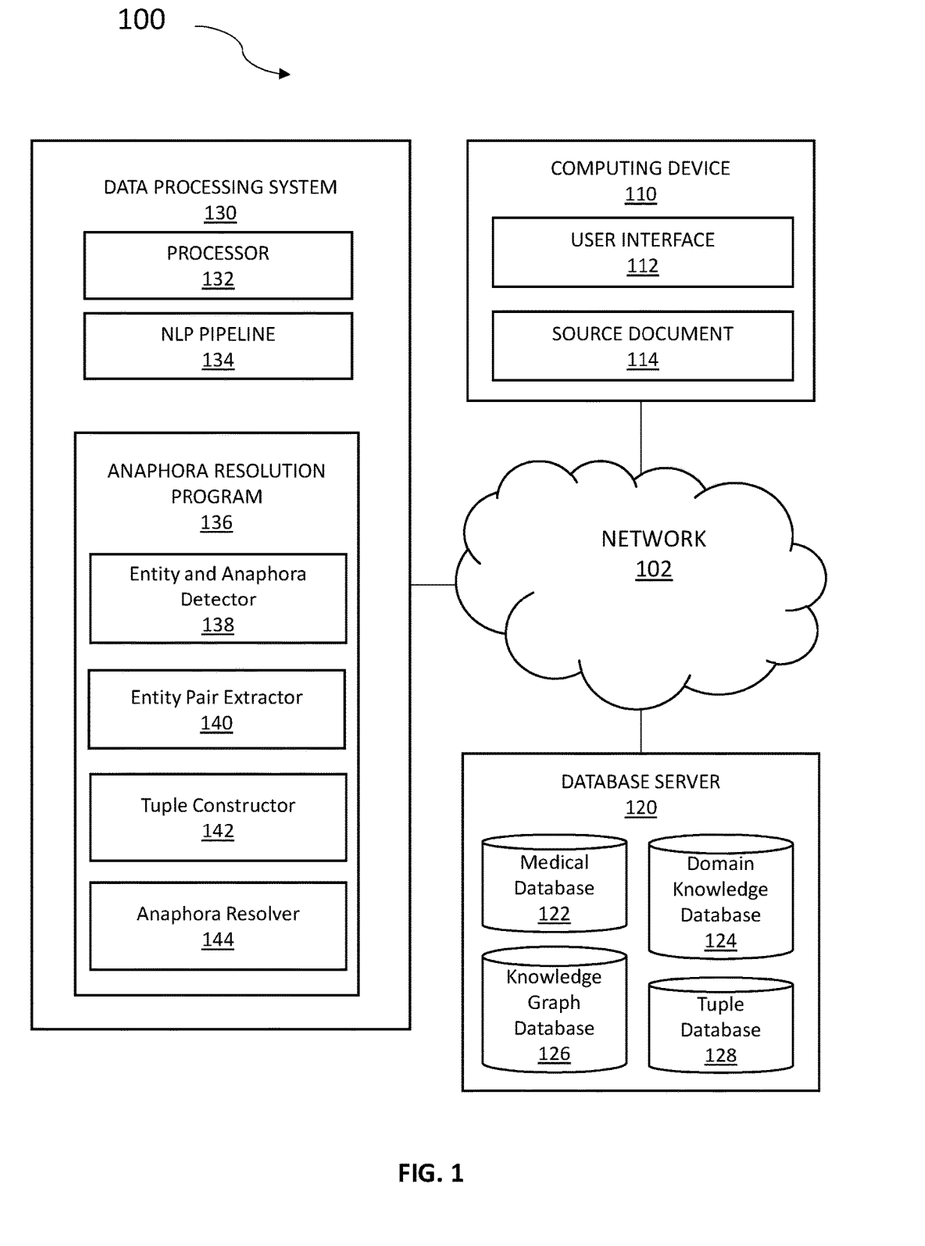
FIG. 1 illustrates a computing environment, in accordance with an embodiment of the present invention.

FIG. 1 is a functional block diagram of a computing environment 100, according to an embodiment of the present invention. Computing environment 100 includes computing device 110, database server 120, and data processing system 130 all connected via network 102. The setup in FIG. 1 represents an example embodiment configuration for the present invention, and is not limited to the depicted setup in order to derive benefit from the present invention.

In the example embodiment, computing device 110 contains user interface 112, and source document 114. In various embodiments, computing device 110 may be a laptop computer, tablet computer, netbook computer, personal computer (PC), a desktop computer, a personal digital assistant (PDA), a smart phone, or any programmable electronic device capable of communicating with database server 120 and data processing system 130 via network 102. Computing device 110 may include internal and external hardware components, as depicted and described in further detail below with reference to FIG. 3. In other embodiments, computing device 110 may be implemented in a cloud computing environment, as described in relation to FIGS. 4 and 5, herein. Computing device 110 may also have wireless connectivity capabilities allowing it to communicate with database server 120, data processing system 130, and other computers or servers over network 102.

User interface 112 is a computer program which allows a user to interact with computing device 110 and other connected devices via network 102. For example, user interface 112 may be a graphical user interface (GUI). In addition to comprising a computer program, user interface 112 may be connectively coupled to hardware components, such as those depicted in FIG. 3, for receiving user input. In the example embodiment, user interface 112 is a web browser, however in other embodiments user interface 112 may be a different program capable of receiving user interaction and communicating with other devices.

Source document 114, in the example embodiment, may be a collection (corpus) of one or more documents containing spans of natural language text related to the medical domain. For example, the source document 114 can be an electronic medical record (EMR) of a patient, and may include one or more sentences. The one or more sentences may include an anaphor that requires resolution. Other examples of source document 114 may include medical journal articles, clinical trial studies, and other natural language text documents that discuss information relevant to the medical domain. In alternative embodiments, source document 114 may include natural language text documents related to other knowledge domains.

In the example embodiment, database server 120 includes medical database 122, domain knowledge database 124, knowledge graph database 126, and tuple database 128 and may be a laptop computer, tablet computer, netbook computer, personal computer (PC), a desktop computer, a personal digital assistant (PDA), a smart phone, a server, or any programmable electronic device capable of communicating with computing device 110 and data processing system 130 via network 102. While database server 120 is shown as a single device, in other embodiments, database server 120 may be comprised of a cluster or plurality of computing devices, working together or working separately.

Medical database 122, in the example embodiment, may include a stored list, or lists, of medical terminology, or medical entities (i.e. words or phrases), from medical dictionaries and medical literature. Examples of such medical entities stored in medical database 122 may include: <knee>, <joint pain>, <brain>, <liver>, <endocrine system>, <cataracts>, <flu>, <disease> and so forth. In alternative embodiments, medical entities may be determined by input from subject matter experts (SMEs). The medical entities may be categorized according to body parts, body systems, symptoms, diseases, or in any other way known to one of ordinary skill in the art. In other embodiments, the lists may be specific to other knowledge domains.

Domain knowledge database 124, in the example embodiment, includes a list of pairs of related medical entities. These lists may be generated automatically, manually, or via a combination of both. For example, the list may be generated randomly and improved through machine learning techniques. The list may be generated, or improved, using manual curation by a subject matter expert (SME). The list of pairs of related entities may be derived from the individual entities in medical database 122. For example, a stored list of pairs of related entities may be represented as Pair1-PairN (P1-PN), where N represents an integer greater than 1, and be listed as follows in domain knowledge database 124: P1<knee, joint pain>, P2<brain, organ>, P3<tumor, measurement>, P4<stomach, acidity>, and so on.

In the example embodiment, an individual entity that may be determined to be related to multiple other entities are listed as individual data objects, such as: P1<lymph node, organ>, P2<lymph node, white blood cell>, P3<lymph node, centimeter>, P4<lymph node, infection>, and so on. In alternative embodiments, the related pairs of entities may be scored, or assigned a value, to denote the strength of the relationship between the two entities. For example, the strength of a relationship between paired entities may denote the commonality of the two entities being used together in a given span of natural language text. For example, <brain, neuron> may have a stronger relationship than <brain, organ>.

Knowledge graph database 126, in the example embodiment, logically depicts the interrelationships between the related pairs of entities stored in domain knowledge database 124. For example, the entity "brain" may be determined by an SME, in the training data, to be related (either tenuously, significantly, or somewhere in between) to "body", "organ", "disease" and various other entities. Knowledge graph database 126 reflects the logical relationships, and their strengths, between "brain", "organ", "disease" and so forth. For example, the knowledge graph may be in the form of a line graph or tree structure.

Tuple database 128, in the example embodiment, includes stored data objects, known as tuples, that contain a finite, and immutable, ordered list of related entity pairs, associated with an anaphor, from initial training data. A tuple, in the example embodiment, contains an antecedent entity (AE) and an entity (E), associated with an anaphor, which may be represented in the following sequence (AE, anaphor, E), (AE, E), or (AE, E, anaphor). Where the anaphor is not expressly stored as part of the tuple, the anaphor may be associated with the tuple using any known means in the art. The determined relationship between a specific AE, E and an anaphor may be based on the results of initial training data. Initial training data may include sets of training tuples constructed using a set of training sentences, wherein each training tuple includes AEs and Es known to be related via corresponding anaphora. The sets of training tuples may be compiled via an automated process (e.g. machine learning process) or through a manual process (e.g. SME review). For example, an SME may be presented with a set of training sentences that include multiple entities connected via an anaphor. The SME may be prompted to identify which candidate AE, of multiple AEs, corresponds to a particular E under consideration via an anaphor.

In natural language processing, there is typically an order wherein an AE, E and anaphor are identified in a multiple sentence structure. For any E under consideration that appears after an anaphor, it is connected to at least one AE which appears before the anaphor. The E under consideration and the AE are connected via the anaphor. For an E under consideration there may be multiple such AEs where each AE may be considered a candidate AE. Some such AEs may be more likely to be connected to the E under consideration via the anaphor whereas other candidate AEs may be less likely to be connected to the E under consideration via the anaphor. These various relationships are represented as tuples in tuple database 128.

With reference to EXAMPLE 1, the resulting set of training tuples may be depicted in tuple database 128 as follows: (tumors, 6 cm, they), (tumors, 5 cm, they), (brain, 6 cm, they), (brain, 5 cm, they), (liver, 6 cm, they), (liver, 5 cm, they). An SME's denotation of (tumors, 6 cm, they) and (tumors, 5 cm, they) as resolving the anaphor they correctly may be noted in tuple database 128 as a score or value of correctness. A lower score or value may be denoted next to tuples that do not correctly resolve the anaphor they. The resulting initial training data may assist the computer program in learning both correct, and incorrect, associations (based on an assigned score or value) between related entities and an anaphor. The greater the amount of initial training data stored in tuple database 128, the higher the probability of success (based on the normalization of tuples) the program will have in identifying correct anaphora resolutions on newly presented natural language text data.

In alternative embodiments, tuple database 128 may also store the tuples that incorrectly pair an entity with an antecedent entity and anaphor, in order to derive correct associations between entities based on tuples that are known to be incorrect. For example, the incorrectly paired tuples (brain, 6 cm, they), (brain, 5 cm, they), (liver, 6 cm, they), and (liver, 5 cm, they) may be known to be incorrect (based on lower assigned scores or values), and therefore by the process of elimination (or by identifying the tuple with a higher assigned score or value), the tuples (tumors, 6 cm, they), and (tumors, 5 cm, they) may be identified as being correct.

Data processing system 130, in the example embodiment, may be a laptop computer, tablet computer, netbook computer, personal computer (PC), a desktop computer, a personal digital assistant (PDA), a smart phone, or any programmable electronic device capable of communicating with computing device 110 and database server 120 via network 102. While data processing system 130 is shown as a single device, in other embodiments, data processing system 130 may be comprised of a cluster or plurality of computing devices, working together or working separately. In the example embodiment, data processing system 130 includes processor 132, NLP pipeline 134, and anaphora resolution program 136. Anaphora resolution program 136 contains instruction sets which may be described using a set of functional modules. Processor 132 executes anaphora resolution program's 136 instruction sets.

NLP pipeline 134 may be a software application which is capable of receiving, analyzing, and understanding natural language text. In the example embodiment, NLP pipeline 134 may comprise features such as dictionaries, syntax and semantics rules, statistical models, and relational databases in order to perform a natural language text analysis of data, such as the data contained in source document 114. Anaphora resolution program 136, in the example embodiment, complements existing NLP pipeline 134 features.

Anaphora resolution program 136, in the example embodiment, operates within NLP pipeline 134 and may be stored on a storage device of data processing system 130. Anaphora resolution program 136 may be a computer program configured to detect one or more entities and an anaphor in a parsed natural language text source document 114 that includes one or more sentences, extract one or more pairs of related entities amongst the one or more entities using domain knowledge, and construct a set of tuples based on initial training data and the extracted pairs of related entities. Based on the constructed set of tuples, anaphora resolution program 136 resolves the anaphor in a given span of parsed natural language text by determining which entity, of the one or more entities, the anaphor references and selects an antecedent entity (AE) among one or more candidate AEs.

With continued reference to FIG. 1, the functional modules of anaphora resolution program 136 include entity and anaphora detector 138, entity pair extractor 140, tuple constructor 142, and anaphora resolver 144.

Entity and anaphora detector 138 includes a set of programming instructions, in anaphora resolution program 136, to detect multiple entities and an anaphor in parsed natural language text comprising one or more sentences. The set of programming instructions is executable by processor 132. In the exemplary embodiment, entity and anaphora detector 138 contains program instructions to detect entities from medical database 122, within a span of natural language text of source document 114.

In the example embodiment, entity and anaphora detector 138 receives input from computing device 110 and database server 120, and is capable of parsing a span of natural language text within a received source document 114, via text parsing tools known to one of ordinary skill in the art. A sub-task of parsing may include the process of tokenization, which demarcates, or classifies, sections of a string of parsed natural language text. The resulting tokens may include entities (i.e. words or phrases) that match known normalized entities stored in medical database 122. The identified entities in the span of natural language text may then be assigned a value, at the discretion of the user, for temporary identification and storage purposes within anaphora resolution program 136.

In the example embodiment, anaphora may comprise a pronoun (i.e. such as him, her, they, it) and/or a generalization (i.e. such as site or any other word or phrase that, absent other information, relates an E to more than one candidate AE). Pronouns may be detected by using an array of NLP rules, known to one of ordinary skill in the art, such as a dictionary that contains an exhaustive list of known pronouns. Anaphora generalizations, on the other hand, may be detected according to any known method in the art (i.e. such as domain knowledge, or entity detection).

In an exemplary embodiment, entity and anaphora detector 138 may detect the following entities (Es) and anaphor, and assign an identification number, from the following parsed sentences (EXAMPLE 1) from source document 114: "Tumors were noted in the brain and liver. They measured 6 cm and 5 cm." (Tumors <E1>, brain <E2>, liver <E3>, 6 cm <E4>, 5 cm <E5>, They <anaphor>). The words were, noted, in, the, and, measured, and may be hidden in the analysis since these words are not recognized as entities within medical database 122, nor recognized as pronouns or generalizations. Measurements, such as centimeters (cm), inches (in), feet (ft), may be included in medical database 122 since these are common in medical diagnostics and analysis, as determined by initial training data. Furthermore, measurements oftentimes may be written in abbreviation or shorthand in natural language text. For example, the word "centimeter" may be depicted as centimeter, centimeters, cm, centro, cmeter, and as such may be stored in medical database 122 under all of the above-referenced variations. In the exemplary embodiment, entity and anaphora detector 138 may be capable of storing the identified Es and anaphora within a span of natural language text, and outputting same to entity pair extractor 140.

Entity pair extractor 140 includes a set of programming instructions in anaphora resolution program 136, to extract pairs of related entities among the multiple entities, within the natural language text of source document 114, based on domain knowledge. The set of programming instructions is executable by processor 132. In the exemplary embodiment, entity pair extractor 140 utilizes initial training data from domain knowledge database 124 and knowledge graph database 126 to determine relatedness between one or more detected entities of a span of natural language text in source document 114.

In the exemplary embodiment, a span of parsed natural language text may cover one, two, or three sentences within a source document 114. Out of the detected multiple entities located within a span of natural language text, entity pair extractor 140 is capable of determining a pair of related entities (i.e. an entity and its antecedent entity), based on initial training data contained within domain knowledge database 124.

With continued reference to the above EXAMPLE 1 sentences, entity pair extractor 140 may determine that related entities for a span of natural language text, based on domain knowledge database 124, include: <tumor, brain>, <tumor, liver>, <tumor, 6 cm>, <tumor, 5 cm>. The identified relationships between entities in a span of natural language text may be tenuous or strong. The determination of relationship strength may be based on the location of one entity in relation to another related entity within the span of natural language text. In the exemplary embodiment, the extracted pairs of related entities may be temporarily stored in entity pair extractor 140 and used in constructing sets of tuples.

Tuple constructor 142 includes a set of programming instructions in anaphora resolution program 136, to construct a set of tuples, wherein each tuple is a data type comprising an anaphor, an antecedent entity (AE) appearing before the anaphor in the span of parsed natural language text, and an entity (E) appearing after the anaphor in the span of parsed natural language text, wherein the anaphor refers to the AE and relates the AE to the E, and wherein the constructing is based on initial training data from tuple database 128, and the extracted pairs of related entities from entity pair extractor 140. The set of programming instructions is executable by processor 132.

In the exemplary embodiment, tuple constructor 142 receives input from entity pair extractor 140 and database server 120. Tuple constructor 142 utilizes initial training data from tuple database 128 (e.g. training tuples) to determine known relationships between AEs, Es, and anaphora for the extracted pairs of related entities from entity pair extractor 140. For any E under consideration that appears after an anaphor, it is connected to at least one AE which appears before the anaphor. The E under consideration and the AE are connected via the anaphor. For an E under consideration there may be multiple such AEs where each AE may be considered a candidate AE. Some such AEs may be more likely to be connected to the E under consideration via the anaphor whereas other candidate AEs may be less likely to be connected to the E under consideration via the anaphor.

Tuple constructor 142 may construct only two tuples with regards to the span of natural language text in EXAMPLE 1: "Tumors were noted in the brain and liver. They measured 6 cm and 5 cm." The first constructed tuple, via tuple constructor 142, may be: (tumors, 6 cm, they) and wherein the second constructed tuple, via tuple constructor 142, may be: (tumors, 5 cm, they). Since there is only one AE ("tumors"), for both Es ("6 cm" and "5 cm"), in the initial training data stored in tuple database 128 associated with the anaphor ("they"), there is no basis to perform disambiguation logic. Disambiguation logic may be utilized when there are multiple AEs for any given E under consideration in a span of natural language text.

In the exemplary embodiment, tuple constructor 142 may determine the entities of a given tuple (AE, E, anaphor) based upon the identified Es and anaphora of entity and anaphora detector 138, the extracted pairs of related Es from entity pair extractor 140, and based upon a set of rules contained within anaphora resolution program 136. One such rule may direct tuple constructor 142 to find the identified anaphor within a given span of natural language text, and scan to the right of the anaphor to find the identified E. Another rule may direct tuple constructor 142 to scan to the left of the anaphor to find the identified AE. Based upon the order, or pattern, of an AE(s), E(s), and anaphor(s) for a given span of natural language text, tuple constructor 142 constructs a set of tuples. Tuple constructor 142 may compare a set of constructed tuples to the training tuples in tuple database 128.

In the exemplary embodiment, tuple constructor 142 may construct multiple sets of tuples where there is more than one AE in the span of parsed natural language text that is associated with the anaphor. With reference to EXAMPLE 2, "8/20 lymph nodes had evidence of metastatic spread. Tumors were noted in the brain and liver. They measured 6 cm and 5 cm.", tuple constructor 142 may construct the following sets of tuples: Tuple1 (tumors, 6 cm, they), Tuple2 (tumors, 5 cm, they), Tuple3 (lymph nodes, 6 cm, they), Tuple4 (lymph nodes, 5 cm, they), Tuple5 (brain, 6 cm, they), Tuple6 (brain, 5 cm, they), Tuple7 (liver, 6 cm, they), and Tuple8 (liver, 5 cm, they). Tuples 5-8 may be eliminated, or filtered, based on training tuples in tuple database 128 which indicate that brain and liver are typically not associated with a measurement. On the other hand, training tuples in tuple database 128 may indicate that tumors and lymph nodes are typically associated with a measurement. Therefore, the anaphor, they, potentially links 6 cm and 5 cm to multiple candidate AEs, tumors and lymph nodes. As such, disambiguation logic is required in order to resolve which candidate AE they refers to.

Anaphora resolver 144 includes a set of programming instructions in anaphora resolution program 136, to resolve the anaphor by determining which entity of the multiple entities is referenced by the anaphor, using the constructed set of tuples, and selecting an AE among one or more candidate AEs. The set of programming instructions is executable by processor 132.

In an exemplary embodiment, anaphora resolver 144 may determine, using the constructed set of tuples from tuple constructor 142, that there are multiple candidate AEs which the anaphor may reference, in relation to an entity under consideration. Based on this determination, anaphora resolver 144 may resolve the anaphor in a variety of ways. One such method to resolve the anaphor may include performing disambiguation logic. In an exemplary embodiment, performing disambiguation logic may include machine learning using probabilistic reasoning to determine which AE, among multiple candidate AEs, an anaphor references in relation to an E under consideration.

With continued reference to EXAMPLE 1: "8/20 lymph nodes had evidence of metastatic spread. Tumors were noted in the brain and liver. They measured 6 cm and 5 cm", anaphora resolver 144 may utilize machine learning to resolve the anaphor They as referring to either lymph nodes or tumors.

Machine learning generally refers to algorithms that can learn from and make predictions on data. These algorithms operate differently from strictly static program instructions by making data-driven predictions or decisions, through building a model from sample inputs, called training data. In embodiments of the invention, machine learning may include the process of analyzing initial training data that includes sets of training sentences, also referred to as sentence clusters. For each sentence cluster in the initial training data, a corresponding set of training tuples contains at least one AE known to be correct (i.e. the AE is known to be related to an E via an anaphor).

As more sentence clusters and their corresponding sets of training tuples (constructed based on known information) are processed and analyzed by the machine learning engine of anaphora resolution program 136, the program extracts features from the sentence clusters, and determines their corresponding weights. The weighted features are used to generate a predictive statistical data model that can be applied to new sentence clusters for which no known information exists. The statistical data model is a practical tool for predicting anaphora resolution in these new sentence clusters. The statistical data model may include a set of training tuples, which can be added to tuple database 128, for future use as predictors in resolving anaphora ambiguities in a span of parsed natural language text containing constructed tuples with candidate AEs, where it is not immediately known which candidate AE is the correct AE.

In the exemplary embodiment, anaphora resolver 144 may employ machine learning to identify a set of features in a span of parsed natural language text comprising constructed tuples corresponding to the initial set of training tuples in tuple database 128. A set of features may refer to identifying characteristics between a related pair of entities in a constructed tuple. For example, a set of training tuples in tuple database 128 may include the entity pairings <tumors, measurement:cm>, and <lymph nodes, measurement:count>. In this example, each of the tumor and lymph node entities is paired with an entity of type measurement. However, a feature of these pairings is that for tumor, the measurement is of type cm, whereas for lymph nodes, the measurement is of the type count. Anaphora resolver 144 may generate a statistical data model using a machine learning engine based on these features (i.e., tumor measurements are frequently stated in sentence clusters using a metric unit, and lymph nodes are frequently stated in sentence clusters using an integer count). The frequency with which these features occur can be built into the statistical model using weighting techniques.

Based on the identified pairs of related entities (AE and E) from the initial set of training tuples in tuple database 128, anaphora resolver 144 may resolve an anaphor having no known resolution. In EXAMPLE 2, for instance, the anaphor they may be resolved using initial training data as follows. Anaphora resolver 144 may determine that the Es under consideration are measurement entities 6 cm and 5 cm. These measurement entities are under consideration because they are related to they, which is an anaphor without a known AE. For example, it is not self-evident whether they refers to tumors or to lymph nodes. If the statistical data model, generated using the initial training data, strongly suggests that tumors are measured in centimeters but lymph nodes are not, then anaphora resolver 144 may determine that the more likely AE to be correct, among the candidate AEs, is tumors, not lymph nodes. Note that this analysis is a technical processing of textual data as it is stored and processed on a computer. The statistical model takes into account how natural language text is expressed in electronic documents. There is no guarantee about the veracity of the information. The solution is purely technical and limited to the field of electronic information processing.

In another embodiment, the feature that may have classified tumors as the correct candidate AE in one instance, and lymph nodes as the correct candidate AE in another instance may be that tumors co-occurred in a span of parsed natural language text with entities that identified as being measured, while lymph nodes co-occurred in a span of parsed natural language text with entities that identified as being counted.

In the exemplary embodiment, anaphora resolver 144 may utilize relevance feedback to ask the user which AE is more suitable to resolve the current anaphor for a given entity, or list of entities, in a span of parsed natural language text. Relevance feedback of a user may be used to check the accuracy of the program by confirming, distinguishing, clarifying, or negating an identified AE by anaphora resolution program 136.

In the example embodiment, anaphora resolver 144 may expand the initial training data of tuple database 128 based on the information obtained either from performing disambiguation logic or utilizing relevance feedback, or both. Expanding the initial training data of tuple database 128 increases the ability of anaphora resolution program 136 to disambiguate instances of anaphora with greater accuracy and without the oversight of an SME.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between computing device 110, database server 120, and data processing system 130.

FIGS. 2A-2E are flowcharts depicting operational steps of a method for directing a computer processor to resolve an anaphor in electronic natural language text, according to an embodiment of the present invention. The methods of FIGS. 2A-2E are discussed further in reference to an illustrative example.

Figure 2A:
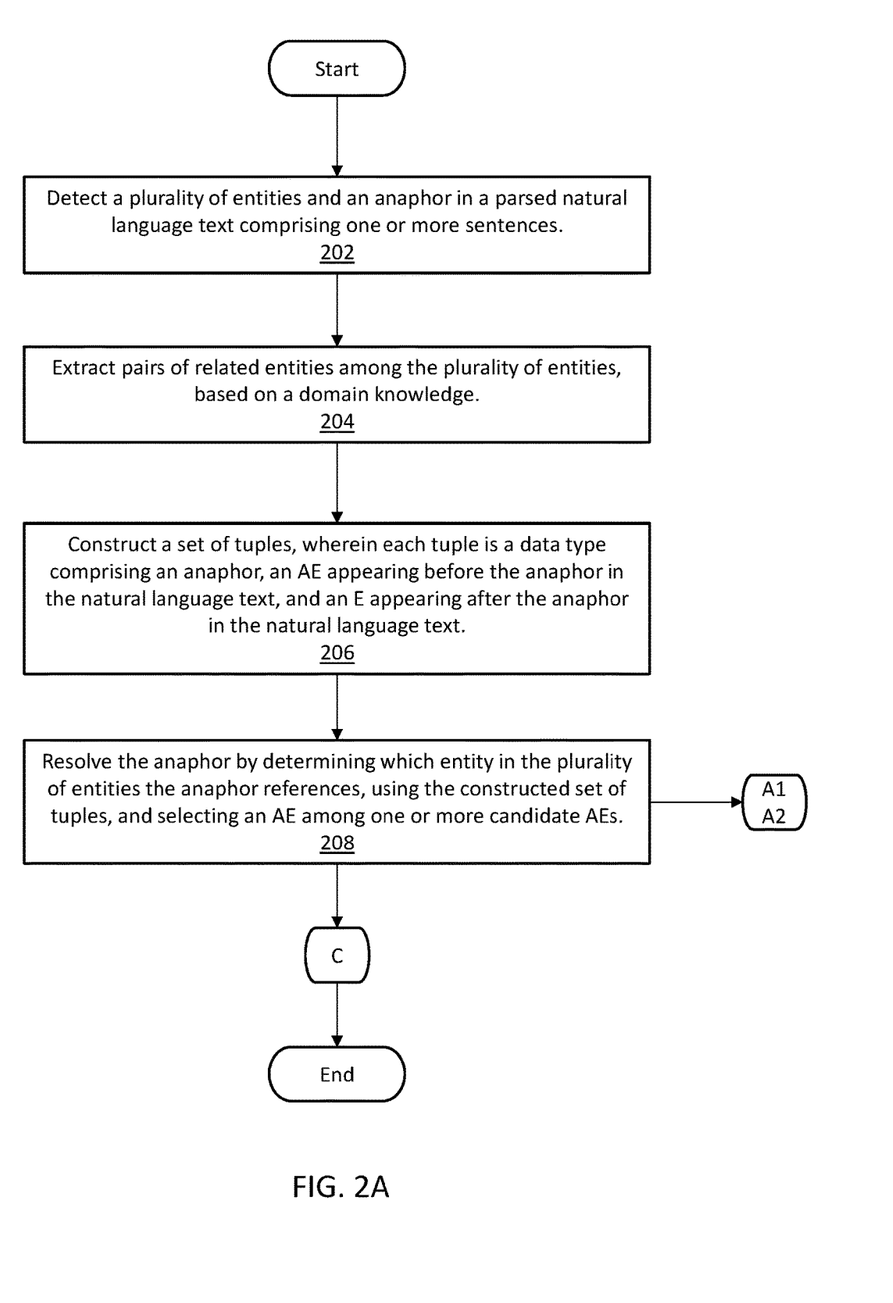
FIGS. 2A-2E are flowcharts illustrating the operation of anaphora resolution program 136 of FIG. 1, in accordance with embodiments of the present invention.

Referring now to FIGS. 1 and 2A, anaphora resolution program 136, via processor 132, detects a plurality of entities and an anaphor in a parsed natural language text comprising one or more sentences (step 202). For example, with reference to EXAMPLE 1, anaphora resolution program 136 receives the span of text in EXAMPLE 1, and detects the anaphor they and its entities; i.e., tumor, brain, liver, 6 cm, 5 cm, based on these entities appearing in medical database 122. As a further example, with reference to EXAMPLE 2, anaphora resolution program 136 receives the span of text in EXAMPLE 2, and detects the anaphor they, and some if its other entities; i.e., 8/20, lymph nodes, metastatic spread, tumors, brain, liver, 6 cm, and 5 cm. Some entities may be filtered out, i.e., not considered, if they are not included in medical database 122 (or filtered based on other criteria).

With continued reference to FIGS. 1 and 2A, anaphora resolution program 136, via processor 132, extracts pairs of related entities among the plurality of entities, based on a domain knowledge. Domain knowledge includes a collection of known pairs of related entities, or a logical knowledge graph including known pairs of related entities, or a set of natural language statements about the domain, or any combination thereof. (step 204). For example, with reference to EXAMPLE 1, anaphora resolution program 136 extracts <tumors, 6 cm>, <tumors, 5 cm>, <tumors, brain>, and <tumors, liver> as pairs of related entities among the plurality of entities, based on known related entity pairs from domain knowledge database 124. The related entity pairs may have been automatically generated or manually selected by an SME before being stored in domain knowledge database 124. As a further example, with reference to EXAMPLE 2, anaphora resolution program 136 extracts <lymph nodes, 8/20>, < lymph nodes, metastatic spread>, <tumors, 6 cm>, <tumors, 5 cm>, <tumors, brain>, <tumors, liver>.

With continued reference to FIGS. 1 and 2A, anaphora resolution program 134, via processor 132, constructs a set of tuples, wherein each tuple is a data type comprising an anaphor, an AE appearing before the anaphor in the natural language text, and an E appearing after the anaphor in the natural language text, wherein the anaphor refers to the AE and relates the AE to the E, and wherein the constructing is based on initial training data and the extracted pairs of related entities. The initial training data includes a set of training tuples constructed using a set of training sentences, each tuple including an anaphor in the set of training sentences, an antecedent entity (AE) in the set of training sentences, and an entity (E) in the set of training sentences, wherein the anaphor is known to reference the AE, and the anaphor is known to relate the AE to the E. (step 206). For example, with reference to EXAMPLE 1, anaphora resolution program 136 constructs a set of tuples from the span of natural language text, including an E, an AE, and an anaphor that relates the E to the AE, i.e. (6 cm, tumors, they) and (5 cm, tumors, they). The constructed set of tuples are based on known related entity pairs from domain knowledge database 124 and known anaphora relationships between related entity pairs, as may have been automatically generated or manually selected by an SME before being stored in tuple database 128. As a further example, with reference to EXAMPLE 2, anaphora resolution program 136 constructs a set of tuples from the span of natural language text, i.e. (8/20, lymph nodes, they), (6 cm, tumors, they), (5 cm, tumors, they).

With continued reference to FIGS. 1 and 2A, anaphora resolution program 134, via processor 132, resolves the anaphor by determining which entity in the plurality of entities the anaphor references, using the constructed set of tuples, and selecting an AE among one or more candidate AEs (step 208). For example, with reference to EXAMPLE 1, anaphora resolution program 136 resolves the anaphor they as referring to tumors. Tumors is the only AE with a known relationship with both 6 cm and 5 cm. As a further example, with reference to EXAMPLE 2, anaphora resolution program 136 resolves the anaphor they as referring to tumors, as opposed to lymph nodes, since tumors are associated with a measurement such as 6 cm and 5 cm and lymph nodes are associated with a count such as 8/20.

Figure 2B:
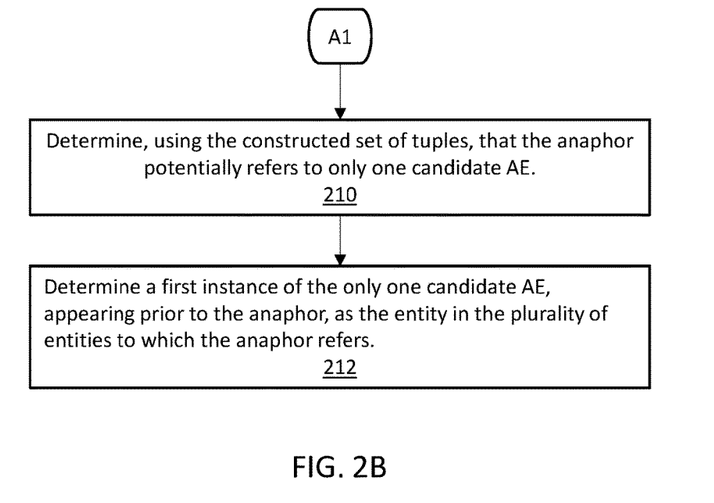

Referring now to FIGS. 1 and 2B, anaphora resolution program 134, via processor 132, determines, using the constructed set of tuples, that the anaphor potentially refers to only one candidate AE (step 210). For example, with reference to EXAMPLE 1, anaphora resolution program 134 determines that they potentially refers to only tumors. There are no other candidate AEs in this example.

Based on the determination that the anaphor potentially refers to only one candidate AE, anaphora resolution program 134 determines a first instance of the only one candidate AE, appearing prior to the anaphor, as the entity in the plurality of entities to which the anaphor refers (step 212). With continued reference to EXAMPLE 1, anaphora resolution program 134 determines a first instance of tumors by searching backwards from the location of the anaphor, they.

Figure 2C:
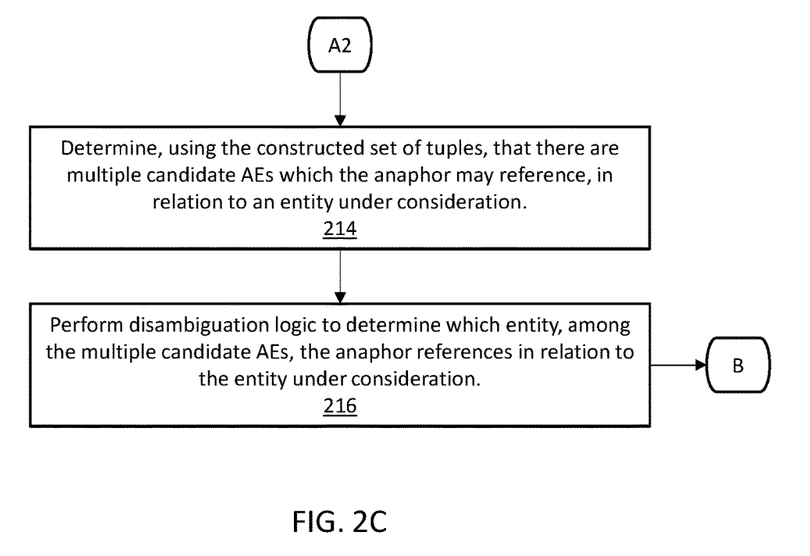

Referring now to FIGS. 1 and 2C, anaphora resolution program 134, via processor 132, determines, using the constructed set of tuples, that there are multiple candidate AEs which the anaphor may reference, in relation to an entity under consideration (step 214). For example, with reference to EXAMPLE 2, anaphora resolution program 134 determines that they potentially refers to tumors or lymph nodes, the two candidate AEs in this example.

Based on the determination that there are multiple candidate AEs which the anaphor may reference, anaphora resolution program 134 performs disambiguation logic to determine which entity, among the multiple candidate AEs, the anaphor references in relation to the entity under consideration (step 216). With continued reference to EXAMPLE 2, anaphora resolution program 134 performs disambiguation logic to determine which candidate AE, tumors or lymph nodes, the anaphor, they, references in relation to the measurements 6 cm and 5 cm. Initial training data indicates that measurements can be associated with tumors, lymph nodes, or margins. Anaphora resolution program 134 searches backwards from they to find tumors in the prior sentence, and lymph nodes two sentences back. Anaphora resolution program 134 then performs disambiguation logic to determine whether tumors or lymph nodes is the referenced AE. The entity margins are eliminated because it is not found within the proximity, at least two or three sentences, of the anaphor, they. Tuple database 128 denotes that lymph nodes are connected to its count, while tumors are connected to a measurement (such as cm). Therefore, they (anaphor) connects 6 cm and 5 cm (Es) to tumors (candidate AE), not lymph nodes (candidate AE).

Figure 2D:
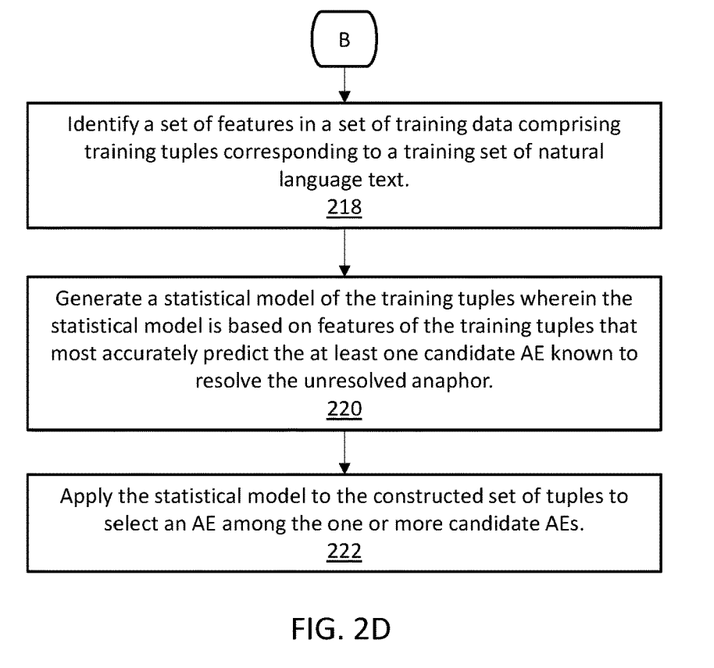

Referring now to FIGS. 1 and 2D, anaphora resolution program 134, via processor 132, identifies a set of features in a set of training data comprising training tuples corresponding to a training set of natural language text, each training tuple comprising an unresolved anaphor, a set of candidate AEs, and an E, wherein at least one candidate AE is known to resolve the unresolved anaphor (step 218). For example, with reference to EXAMPLE 1 and EXAMPLE 2, anaphora resolution program 134 identifies that tumors in training data may co-occur in sentences with entities that identify as tissue-based organs, while lymph nodes may co-occur in sentences with entities that identify as muscle-based organs.

With continued reference to FIGS. 1 and 2D, anaphora resolution program 134, via processor 132, generates a statistical model of the training tuples wherein the statistical model is based on features of the training tuples that most accurately predict the at least one candidate AE known to resolve the unresolved anaphor (step 220). With reference to EXAMPLE 2, anaphora resolution program 134 generates a percentage of likelihood that tumors is associated with 6 cm and 5 cm versus lymph nodes being associated with 6 cm and 5 cm, based on assigning values to features of the respective candidate AEs. In EXAMPLE 2, tumors being located in a proximity sentence to entities naming tissue-based organs may be a 45% predictor that tumors is the candidate AE known to resolve the unresolved anaphor.

In another embodiment, anaphora resolution program 134, via processor 132, generates a statistical model of the training tuples wherein the statistical model is further based on features of the training tuples that most accurately predict at least one candidate AE known not to resolve the unresolved anaphor.

In an exemplary embodiment, performing disambiguation logic further includes applying the statistical model to the constructed set of tuples to select an AE among the one or more candidate AEs.

With continued reference to FIGS. 1 and 2D, anaphora resolution program 134, via processor 132, performs disambiguation logic by applying the statistical model to the constructed set of tuples to select an AE among the one or more candidate AEs (step 222). In an exemplary embodiment, anaphora resolution program 134 generates scores for the constructed set of tuples and selects a candidate AE among the one or more candidate AEs based on the selected candidate AE having a score within a threshold of a desired score.

Figure 2E:
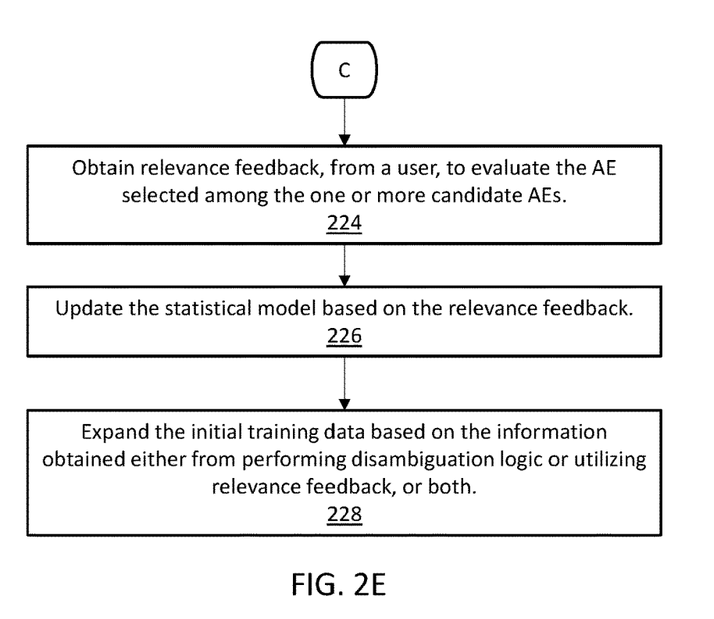

Referring now to FIGS. 1 and 2E, anaphora resolution program 134, via processor 132, obtains relevance feedback, from a user, to evaluate the AE selected among the one or more candidate AEs (step 224). With reference to EXAMPLE 2, anaphora resolution program 134 generates a percentage of likelihood that tumors is associated with 6 cm and 5 cm versus lymph nodes being associated with 6 cm and 5 cm, based on assigning values to features of the respective candidate AEs. In EXAMPLE 2, tumors being located in a proximity sentence to entities naming tissue-based organs may be a 45% predictor that tumors is the candidate AE known to resolve the unresolved anaphor.

With continued reference to FIGS. 1 and 2E, anaphora resolution program 134, via processor 132, updates the statistical model based on the relevance feedback (step 226).

With continued reference to FIGS. 1 and 2E, anaphora resolution program 134, via processor 132, expands the initial training data based on the information obtained either from performing disambiguation logic or utilizing relevance feedback, or both (step 228).

Figure 3:
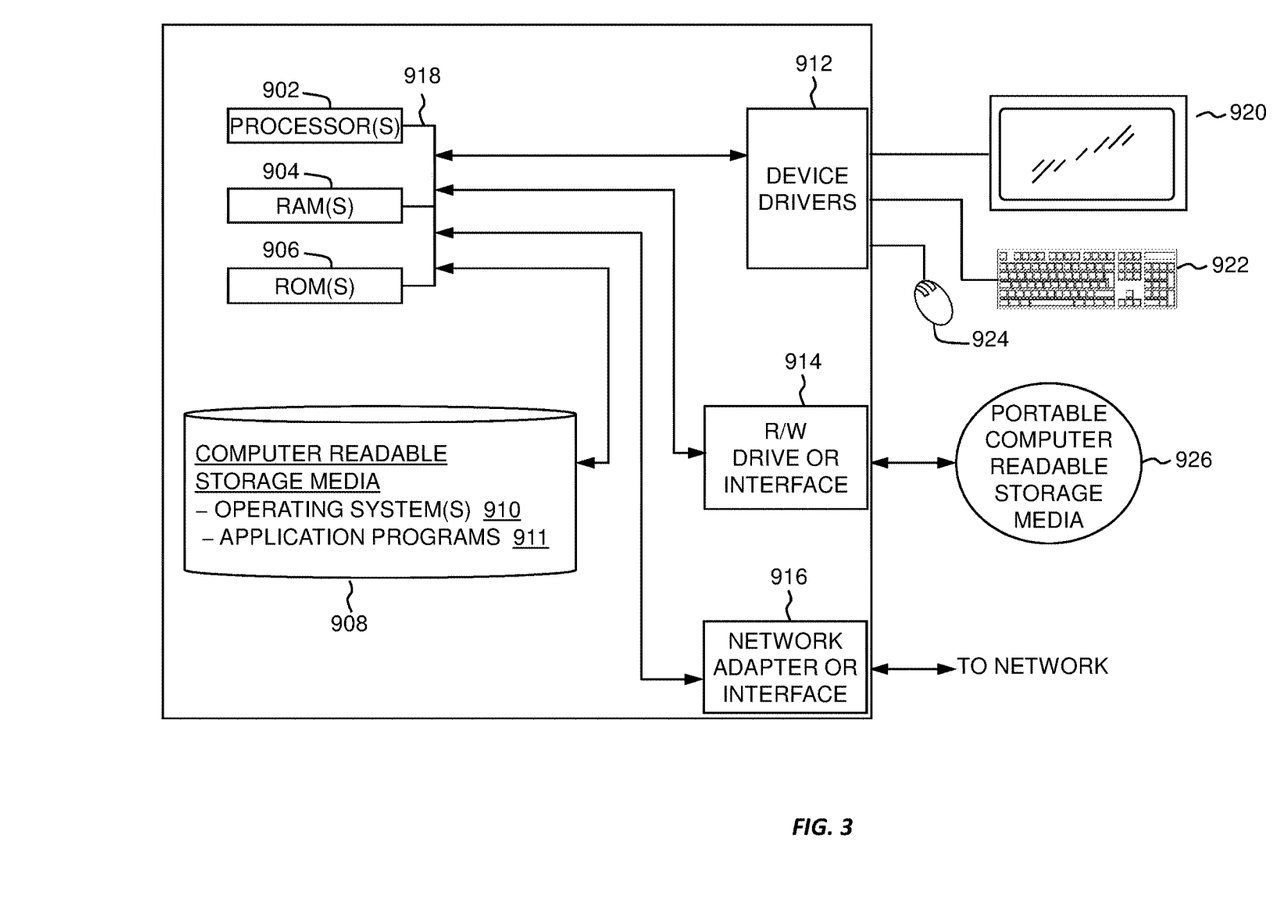
FIG. 3 is a diagram graphically illustrating the hardware components of a computing environment of FIG. 1, in accordance with an embodiment of the present invention.

FIG. 3 is a block diagram depicting components of a computing device (such as computing device 110, database server 120, or data processing system 130, as shown in FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as anaphora resolution program 136, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 911 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 911 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
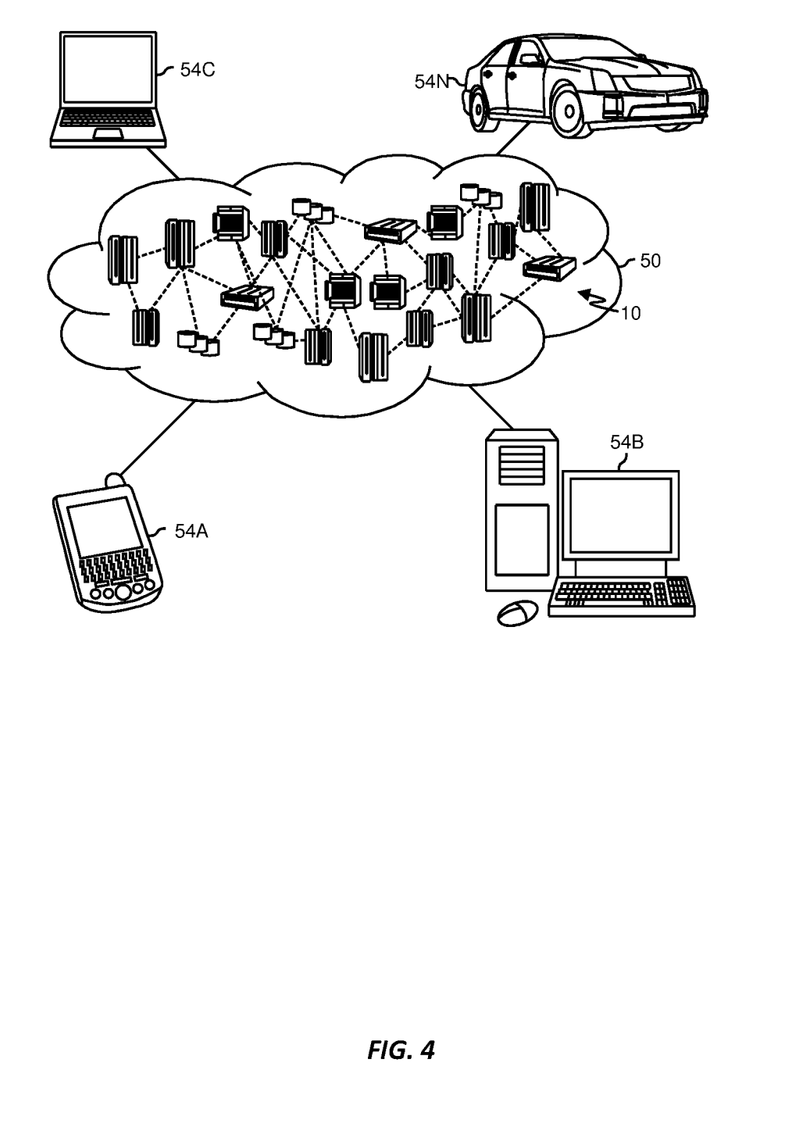
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
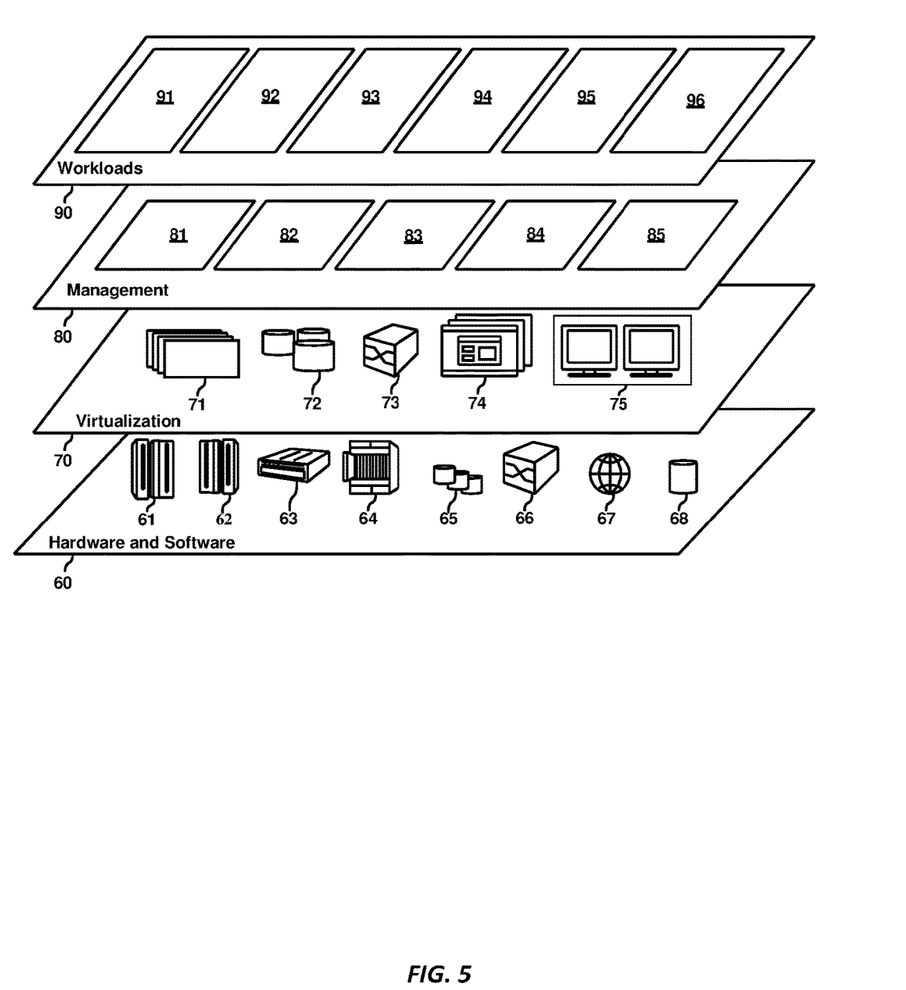
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A method for directing a computer processor to resolve an anaphor in electronic natural language text, comprising:
   detecting a plurality of entities and an anaphor in a span of parsed natural language text comprising one or more sentences;
   extracting pairs of related entities among the plurality of entities, based on domain knowledge;
   constructing a set of tuples, wherein each tuple is a data type comprising an anaphor, an antecedent entity (AE) appearing before the anaphor in the span of parsed natural language text, and an entity (E) appearing after the anaphor in the span of parsed natural language text, wherein the anaphor refers to the AE and relates the AE to the E, and wherein the constructing is based on initial training data and the extracted pairs of related entities; and
   resolving the anaphor by determining which entity in the plurality of entities the anaphor references, using the constructed set of tuples, and selecting an AE among one or more candidate AEs.

2. The method of claim 1, wherein the domain knowledge comprises a collection of known pairs of related entities, or a logical knowledge graph comprising known pairs of related entities, or a set of natural language statements about the domain, or any combination thereof.

3. The method of claim 1, wherein the initial training data comprises a set of training tuples constructed using a set of training sentences, each training tuple comprising:
   an anaphor in the set of training sentences, an antecedent entity (AE) in the set of training sentences, and an entity (E) in the set of training sentences, wherein the anaphor is known to reference the AE, and the anaphor is known to relate the AE to the E.

4. The method of claim 1, wherein for a given anaphor to be resolved, resolving the anaphor comprises:
   determining, using the constructed set of tuples, that the anaphor potentially refers to only one candidate AE; and
   determining a first instance of the only one candidate AE, appearing prior to the anaphor, as the entity in the plurality of entities to which the anaphor refers.

5. The method of claim 1, wherein for a given anaphor to be resolved, resolving the anaphor comprises:
   determining, using the constructed set of tuples, that there are multiple candidate AEs which the anaphor may reference, in relation to an entity under consideration; and
   performing disambiguation logic to determine which entity, among the multiple candidate AEs, the anaphor references in relation to the entity under consideration.

6. The method of claim 5, wherein performing disambiguation logic comprises:
   identifying a set of features in a set of training data comprising training tuples corresponding to a training set of natural language text, each training tuple comprising:
   an unresolved anaphor, a set of candidate antecedent entities (AEs), and an entity (E), wherein at least one candidate AE is known to resolve the unresolved anaphor; and
   generating a statistical model of the training tuples wherein the statistical model is based on features of the training tuples that most accurately predict the at least one candidate AE known to resolve the unresolved anaphor.

7. The method of claim 6, wherein the statistical model is further based on features of the training tuples that most accurately predict at least one candidate AE known not to resolve the unresolved anaphor.

8. The method of claim 6, wherein performing disambiguation logic further comprises applying the statistical model to the constructed set of tuples to select an AE among the one or more candidate AEs.

9. The method of claim 8, wherein applying the statistical model to the constructed set of tuples comprises generating scores for the constructed set of tuples and selecting a candidate AE among the one or more candidate AEs based on the selected candidate AE having a score within a threshold of a desired score.

10. The method of claim 1, further comprising:
    obtaining relevance feedback, from a user, to evaluate the AE selected among the one or more candidate AEs; and
    updating the statistical model based on the relevance feedback.

11. The method of claim 1, further comprising:
    expanding the initial training data based on the information obtained either from performing disambiguation logic or utilizing relevance feedback, or both.

12. A computer program product for directing a computer processor to resolve an anaphor in electronic natural language text, comprising a non-transitory tangible storage device having program code embodied therewith, the program code executable by a processor of a computer to perform a method, the method comprising:
    detecting, by the processor, a plurality of entities and an anaphor in a span of parsed natural language text comprising one or more sentences;
    extracting, by the processor, pairs of related entities among the plurality of entities, based on domain knowledge;
    constructing, by the processor, a set of tuples, wherein each tuple is a data type comprising an anaphor, an antecedent entity (AE) appearing before the anaphor in the span of parsed natural language text, and an entity (E) appearing after the anaphor in the span of parsed natural language text, wherein the anaphor refers to the AE and relates the AE to the E, and wherein the constructing is based on initial training data and the extracted pairs of related entities; and
    resolving, by the processor, the anaphor by determining which entity in the plurality of entities the anaphor references, using the constructed set of tuples, and selecting an AE among one or more candidate AEs.

13. The computer program product of claim 12, wherein for a given anaphor to be resolved, resolving the anaphor comprises:
    determining, by the processor, using the constructed set of tuples, that there are multiple candidate AEs which the anaphor may reference, in relation to an entity under consideration; and performing, by the processor, disambiguation logic to determine which entity, among the multiple candidate AEs, the anaphor references in relation to the entity under consideration.

14. The computer program product of claim 13, wherein performing disambiguation logic comprises:
   identifying, by the processor, a set of features in a set of training data comprising training tuples corresponding to a training set of natural language text, each training tuple comprising:
      an unresolved anaphor, a set of candidate antecedent entities (AEs), and an entity (E), wherein at least one candidate AE is known to resolve the unresolved anaphor; and
   generating, by the processor, a statistical model of the training tuples wherein the statistical model is based on features of the training tuples that most accurately predict the at least one candidate AE known to resolve the unresolved anaphor.

15. The computer program product of claim 14, wherein performing disambiguation logic further comprises applying the statistical model to the constructed set of tuples to select an AE among the one or more candidate AEs.

16. The computer program product of claim 12, further comprising:
   obtaining, by the processor, relevance feedback, from a user, to evaluate the AE selected among the one or more candidate AEs; and
   updating, by the processor, the statistical model based on the relevance feedback.

17. A computer system for performing electronic natural language processing on unstructured data, comprising:
   one or more computer devices each having one or more processors and one or more tangible storage devices; and
   a program embodied on at least one of the one or more storage devices, the program having a plurality of program instructions for execution by the one or more processors, the program instructions comprising instructions for:
      detecting, by the computer, a plurality of entities and an anaphor in a span of parsed natural language text comprising one or more sentences;
      extracting, by the computer, pairs of related entities among the plurality of entities, based on domain knowledge;
      constructing, by the computer, a set of tuples, wherein each tuple is a data type comprising an anaphor, an antecedent entity (AE) appearing before the anaphor in the span of parsed natural language text, and an entity (E) appearing after the anaphor in the span of parsed natural language text, wherein the anaphor refers to the AE and relates the AE to the E, and wherein the constructing is based on initial training data and the extracted pairs of related entities; and
      resolving, by the computer, the anaphor by determining which entity in the plurality of entities the anaphor references, using the constructed set of tuples, and selecting an AE among one or more candidate AEs.

18. The computer system of claim 17, wherein for a given anaphor to be resolved, resolving the anaphor comprises:
   determining, by the computer, using the constructed set of tuples, that there are multiple candidate AEs which the anaphor may reference, in relation to an entity under consideration; and
   performing, by the computer, disambiguation logic to determine which entity, among the multiple candidate AEs, the anaphor references in relation to the entity under consideration.

19. The computer system of claim 18, wherein performing disambiguation logic comprises:
   identifying, by the computer, a set of features in a set of training data comprising training tuples corresponding to a training set of natural language text, each training tuple comprising:
      an unresolved anaphor, a set of candidate antecedent entities (AEs), and an entity (E), wherein at least one candidate AE is known to resolve the unresolved anaphor; and
   generating, by the computer, a statistical model of the training tuples wherein the statistical model is based on features of the training tuples that most accurately predict the at least one candidate AE known to resolve the unresolved anaphor.

20. The computer system of claim 17, further comprising:
   obtaining, by the computer, relevance feedback, from a user, to evaluate the AE selected among the one or more candidate AEs; and
   updating, by the computer, the statistical model based on the relevance feedback.

* * * * *